(12) United States Patent
Farley

(10) Patent No.: US 6,248,243 B1
(45) Date of Patent: Jun. 19, 2001

(54) SOLIDS MONITORING FILTER METER

(76) Inventor: James T. Farley, 10718 Braewick, Houston, TX (US) 77096

( * ) Notice: Subject to any disclaimer, the term of this patent is extended or adjusted under 35 U.S.C. 154(b) by 0 days.

(21) Appl. No.: 09/583,934

(22) Filed: May 31, 2000

Related U.S. Application Data

(63) Continuation-in-part of application No. 09/095,946, filed on Jun. 11, 1998, now abandoned.

(51) Int. Cl.[7] .............................. B01D 33/58; C02F 1/00
(52) U.S. Cl. ........................................... 210/741; 210/411
(58) Field of Search .................. 210/257.2, 437, 210/440, 444, 739, 741, 749, 753, 754, 755, 756, 769, 772, 791, 797, 793, 806, 808, 88, 90, 103, 108, 199, 201, 203, 206, 411

(56) References Cited

U.S. PATENT DOCUMENTS

| | | | |
|---|---|---|---|
| 4,086,166 | * | 4/1978 | Martin . |
| 4,753,724 | * | 6/1988 | Womble . |
| 4,882,061 | * | 11/1989 | Petrucci . |
| 5,082,557 | * | 1/1992 | Grayson . |
| 5,525,225 | * | 6/1996 | Janik . |

* cited by examiner

Primary Examiner—Chester T. Barry
(74) Attorney, Agent, or Firm—Russell J. Egan

(57) ABSTRACT

A cartridge filter element of known degree of filtration is the central part of the meter for monitoring water quality with respect to suspended particles. Typically the holder of the filter element is located in a sampling line which is at a point downstream of the commercial primary filter being monitored. Sensors of rate and differential pressure send signals to the microprocessor of the meter which measures the transmissibility of the monitor cartridge filter. Thus the microprocessor calculations determine the quality of the commercial primary filter effluent. Also microprocessor logic manipulates the steps of the meter and sends signals to display, controls and alarms depending on the water quality observed. A tangible additional benefit of this meter in comparison to an optical turbidity meter is the identification of the composition of the solids. The flushing step reveals the response of the monitor filter to solids removal by flushing agent or agents. This can help with full scale design of chemical treatment of injection wells which have been inadvertently damaged by solids.

7 Claims, 6 Drawing Sheets

SOLIDS MONITORING FILTER METER

CROSS REFERENCE TO RELATED APPLICATION

This application is a continuation-in-part of my application Ser. No. 09/095,946 filed Jun. 11, 1998, now abandoned.

BACKGROUND OF THE INVENTION

1. The Field of the Invention

This invention relates to the continuous monitoring of the effluent of a filter. The meter measures the quality of the filter discharge and controls the filter cycle. This, in turn, maximizes the quality of the filter effluent.

2. Background of the Invention

Filters are used to remove solids of varying composition, concentration and size distribution from flowing fluids. Therefore, various types of filters are used to remove these solids. Differential pressure across a filter increases as the filter collects contaminants from the fluid runs. Most filters have cycles where they filter, backwash to remove the collected contaminants and filter again. It is an indication of length of the filtration stage because harmful by-pass of solids occurs at high differential pressure. Solids by-pass results in poorer water quality, which is one of the problems of inefficient filter operation.

One approach has been to measure the solids concentration of the filter effluent regardless of the size distribution or the composition of the solids. Solids concentration alone is not solely indicative of water quality related to injectivity into a producing formation in a waterflood. Common contaminants, such as oil and scale, can cause poor water quality, yet they remain undetected by solids meters. This often indicates that filtration alone is adequate for achieving water quality which will protect water injection wells from damage. Inadvertent damage by oil droplets and scale would have been overlooked.

THE PRIOR ART

The prior art is represented by U.S. patents. U.S. Pat. No. 3,357,236 to Kasten utilizes two filter units in series to remove only the solid contaminants, and then only the water contaminants, and then measures the pressure differential across the separate filters. U.S. Pat. No. 3,499,315 to Marino has a filter element selected for maximum acceptable limit of the system placed between a fluid reservoir and a suction pump. U.S. Pat. No. 3,452,586 to Childs et al pumps fluid through a filter and measures the pressure differential across the filter. Periodically the filter is back washed with primary filtered fluid. U.S. Pat. No. 3,934,471 to White et al measures the concentration of the material and the flow rate and uses these measurements to give an output proportional to the product of the signals, this being proportional to the rate of passage of the material. U.S. Pat. No. 4,786,473 to Mukogawa divides a water sample and passes the divided samples through filters of different sizes while measuring the respective flow rates. The ratio of the flow rates is related to the concentration of the solids.

Patents related to the aspects of the microprocessor and its prior art are also presented. U.S. Pat. No. 5,319,964 to Stephenson et al. utilizes a single pressure transducer connected to a computer having a memory in which fluid level-to-fluid volume conversion data are stored. U.S. Pat. No. 5,146,764 to Bauman et al. utilizes operational parameters to control a variable width diffused section of a centrifugal compressor. The control system measures flow and temperature to accomplish this. U.S. Pat. No. 5,505,763 to Reighard et al. gives a control system for constant air flow through a powder collector. The static pressure and fan speed are adjusted by the control system of the cartridge filters. U.S. Pat. No. 5,621,657 to Ferri measures pressure across an orifice. The pressure transducer unit is connected via communication line to an analog to digital input channel connected to computer system. Computer logic to determine the type of pressure measurement is presented.

BRIEF SUMMARY OF THE INVENTION

In accordance with the present invention, the quality of a water or fluid is monitored by a cartridge filter element. The sensitivity of the monitoring element to changes in water quality is measured by the fluctuations in rate and differential pressure across it. Further, the application of the meter in monitoring water quality for injection into the subsurface is ideal since the cartridge filter element models a formation better than a single or a bundle of capillaries. Flow channels of a filter intersect much as those of a porous rock. Along with the similar matrix, the flow direction is simulated; radial flow has a velocity gradient in the direction of flow. Velocity is inversely proportional to the position along the radius of flow away from the wellbore. While the monitor filter element simulates the wellbore, sensors signal a microprocessor, which calculates the transmissibility of the filter element as water quality changes. Filtration ratio is the ratio of transmissibility, at any time, divided by the initial transmissibility of the monitor cartridge filter. The changes in primary filter effectiveness are observed by the microprocessor. Computer logic dictates alarm and control signals, which ensure optimum water quality.

It is the principal objective of this invention to provide a filter element of a specific degree of filtration for determining the quality of effluent from a primary filter. The length of the filter cycle of the primary filter is established by the monitor filter, the life of which is dependent on the effluent water quality. The meter is configured so the monitor element can be backflowed, flushed or replaced.

It is another object of the invention to determine the need for back flowing the monitor filter element and signal the appropriate valves to facilitate the backflow step. It is yet another object of the invention to signal the need to manually flush the monitor filter with a reactive fluid to remove the contaminant and restore transmissibility to the monitor element.

The foregoing and other objects and advantages of the invention will appear in the following detailed description.

BRIEF DESCRIPTION OF THE DRAWINGS

The present invention will be described, by way of example, with reference to the accompanying drawings, in which.

DETAILED DESCRIPTION OF AN EMBODIMENT OF THE INVENTION

Figure 1:
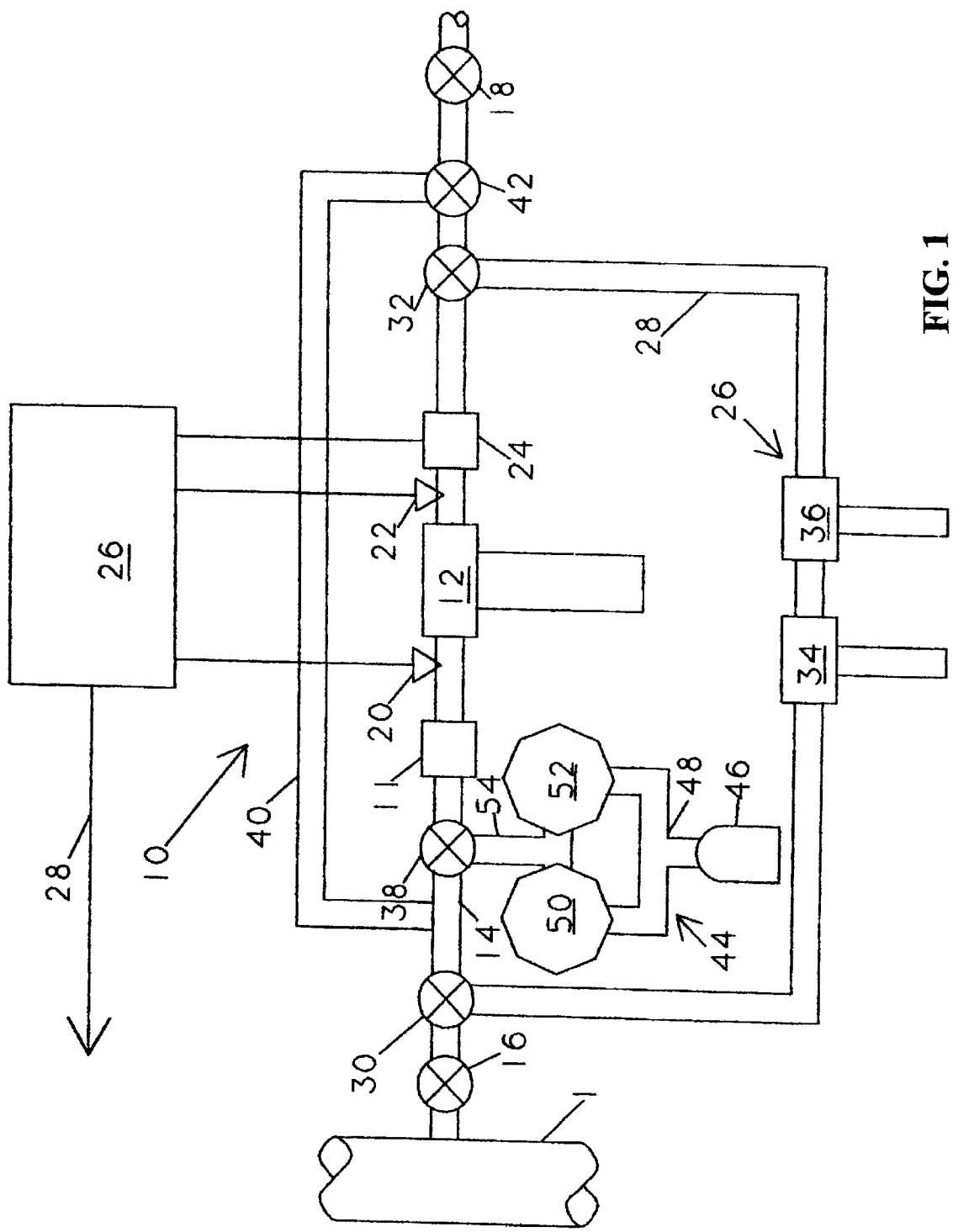
FIG. 1 is a schematic of a solids monitor filter system according to the present invention.

Turning first to FIG. 1, the subject solids monitoring filter meter system 10 consists of a monitor filter 12 mounted in a sampling line 14 between an inlet valve 16 connected to a main pipeline 1 and an outlet valve 18. Upstream of the filter there is a heater 11 and a first pressure transducer 20 and downstream of the filter there is a like second pressure transducer 22 and a flow monitor 24. The system includes a back flow loop 26 including a conduit 28, valves 30 and 32 connecting the back flow loop upstream and downstream, respectively, of the monitor filter 12, coarse and fine filters 34 and 36, respectively, valve 30 connecting exhaust conduit 40 upstream of the filter and valve 42 connecting the conduit downstream of the filter 12. A reagent flush loop 44 includes a pressurizing source 46 connected via a manifold 48 to reagent chambers 50 and 52 which are connected by manifold 54 to the circuit upstream of the filter 12 through valve 38. A micro-processor 26 is connected via 28 to the various components for monitoring, recording and controlling (not shown) the system.

The basic solids monitor filter 12 is somewhat similar to a conventional automotive oil filter having a header 62 and a detachable housing 64. The header 62 has an inlet opening 66 which extends radially to the center of the header where it executes a right angle turn to form a downward conduit 68 which is fitted with a perforated extension 70. The header also has a radial exit port 72. The detachable housing 64 is received on the header by matching threads 74 which provides ready access to the filter module 76. It will be appreciated by those skilled in the art that this monitor filter acts in a manner similar to the formation downhole.

The flow rate through the permeable medium 76 is measured by a flow meter 24 which sends a signal to the microprocessor. The upstream pressure transducer 20 measures the upstream pressure and sends a signal to the microprocessor 26. The microprocessor 26 takes the flow rate signal and divides it by the square root of the differential pressure signal resulting in transmissibility. A deluxe solids monitoring device (not shown) may be needed for problem applications. A booster pump (not shown) is needed because the liquid is returned to the same line pressure from which it originated. Finally, the downstream pressure transducer 22 measures the downstream pressure and sends a signal to the micro-computer 26. In the micro-computer 26, the downstream pressure signal is subtracted from the upstream pressure signal resulting in a differential pressure signal. The flow rate signal, from the flow meter 24, is divided by the square root of the differential pressure signal to determine transmissibility.

The system has three functions: monitor solids with a filter element; backflow the filter element; and flush the filter cartridge. Referring to the details of FIG. 1, in describing monitoring, the primary function of the system, the main stream of water or fluid is dynamically sampled. This side stream flows through valves 16, 30 and 38 to the monitor filter 12. Sensors 20 and 22 are located upstream and downstream, respectively, of the monitor filter 12. The sensors, which preferably are pressure transducers, are at equal elevation to prevent any error due to gravity. Sensors 20 and 22 send electrical signals to the microprocessor 26 which serves as a signal processor and controller of the operation of at least some of the systems flow control valves.

The sample water stream then goes through the flow meter 24 (which sends a signal to the microprocessor 26) and continues through valves 32, 42 and 18 to a recycle waste stream, thus completing the flow loop to the monitor meter.

The secondary mode of the system is back flowing, which is accomplished by flowing water in the reverse direction through the monitor filter element 12. This occurs when water flows through valve 30, coarse filter 34, which removes large suspended particles, fine filter 36, which eliminates small particles, through valve 32 back through the monitor filter 12 to valve 30, through conduit 40 to valves 42 and 18 to the waste recycle discharge.

The tertiary status of the system is flushing the monitor filter 12 with reagent to remove particles from the face or the interstices of the filter medium 76. The reagent reservoirs 50 and 52 are pressured by a source 46 through manifold 48. The reagent flows out of the selected reservoir 52 through the manifold 54, through valve 38 past the heater 11 and the upstream pressure transducer 20 into the monitor filter housing 64, and the downstream pressure transducer 22. After passing through the flow meter 24, it flows through the valves 32, 42 and 18 to a recycle waste stream. Thus completes the detailed description of the water flow paths for the meter functions: monitor, backflow and flush.

Figure 2:
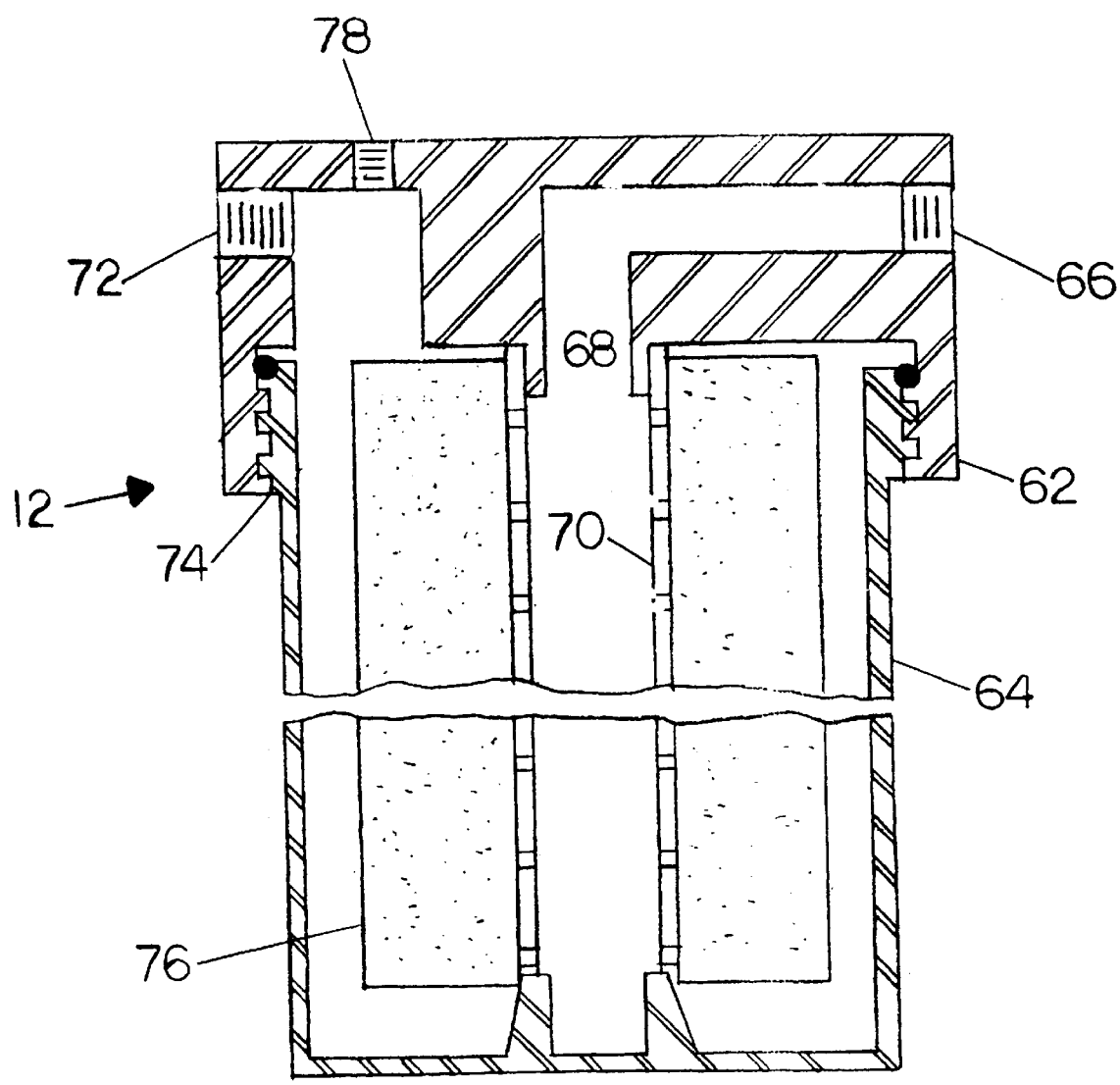
FIG. 2 is a vertical section through a cartridge filter of the present invention.

In operation, the system 10 would typically be located on a sample line downstream of a commercial filtration device and would continuously monitor the effluent of the primary filter. FIG. 2 shows the cross-section of the holder and filter element in particular the flow direction of the water. Note the sampled water flow radially from the center of the filter element to the outer radius of the cartridge. This flow configuration better duplicates radial flow in a wellbore which it is simulating.

Particle monitoring depends on the end use of the water as well as the type of filter used to remove the particles. The required degree of filtration sets the size of the filter element selected for the monitor filter and the normal flow direction through the filter element is reversed because the radial flow direction is from the inside out in the manner of water flow in a wellbore. Particle separation depends upon the velocity gradient, therefore it must be simulated.

The quality of the water, which is sampled downstream of a primary filter, depends upon its efficiency at removing waterborne particles. Particles which are not filtered out remain in the water to affect the monitor filter element 12. Unfiltered suspended particles can screen out on the face of the monitor filter, penetrate the filter element and deposit in the interstices or, if small enough, pass through the monitor cartridge entirely. Many mechanisms influence the entrapment of particles and their affects on the water are to slow its flow rate and to increase the differential pressure across the monitor filter element 12. Since gas blockage in the monitor filter 12 would give a similar result, an air bleed port 78 allows air to be removed when the system is started. A measure of primary filter effectiveness is differential pressure and flow rate through the monitor filter 12. Conventionally, the relationship of water quality is the flowrate divided by the differential pressure. Since the meter is not isolated from fluctuation in sample line pressure upstream and variation in discharge pressure downstream, dividing the flowrate through the monitor filter 12 normalizes the effect of water quality by the square root of the differential pressure. The computation of the transmissibility of the monitor filter 12 is performed on the signals from the upstream pressure 20, the downstream pressure 22, and the flow meter 24 by the microprocessor 26 using equation (2) detailed in FIG. 3

The additional equations used in the meter microprocessor to compute the necessary results for logic functions of displays are as follows:

$$FR = T/T_0$$

where FR is filtration ratio which is defined as the transmissibility T of the monitor filter element 10 divided by the initial transmissibility $T_0$. The filtration ratio can range between zero and one depending on how solids-free the commercial primary filter has made the effluent being monitored. Another indicator is filter effectiveness FE, which is instantaneous, look at slope of 8 the filtration ratio FR versus time t curve.

$$FE = (FR_i - FR_{i-1})(t_i - t_{i-1})$$

Since FR is dimension less, the units of FE are reciprocal minutes. CT is cumulative throughput in gallons by the equation:

$$CT = \Sigma (Q_i + Q_{i-1})/2(t_i - t_{i-})$$

where Q is the flowrate in gallons per minute. Cumulative throughput CT is indicative of primary filter water quality.

Figure 3:
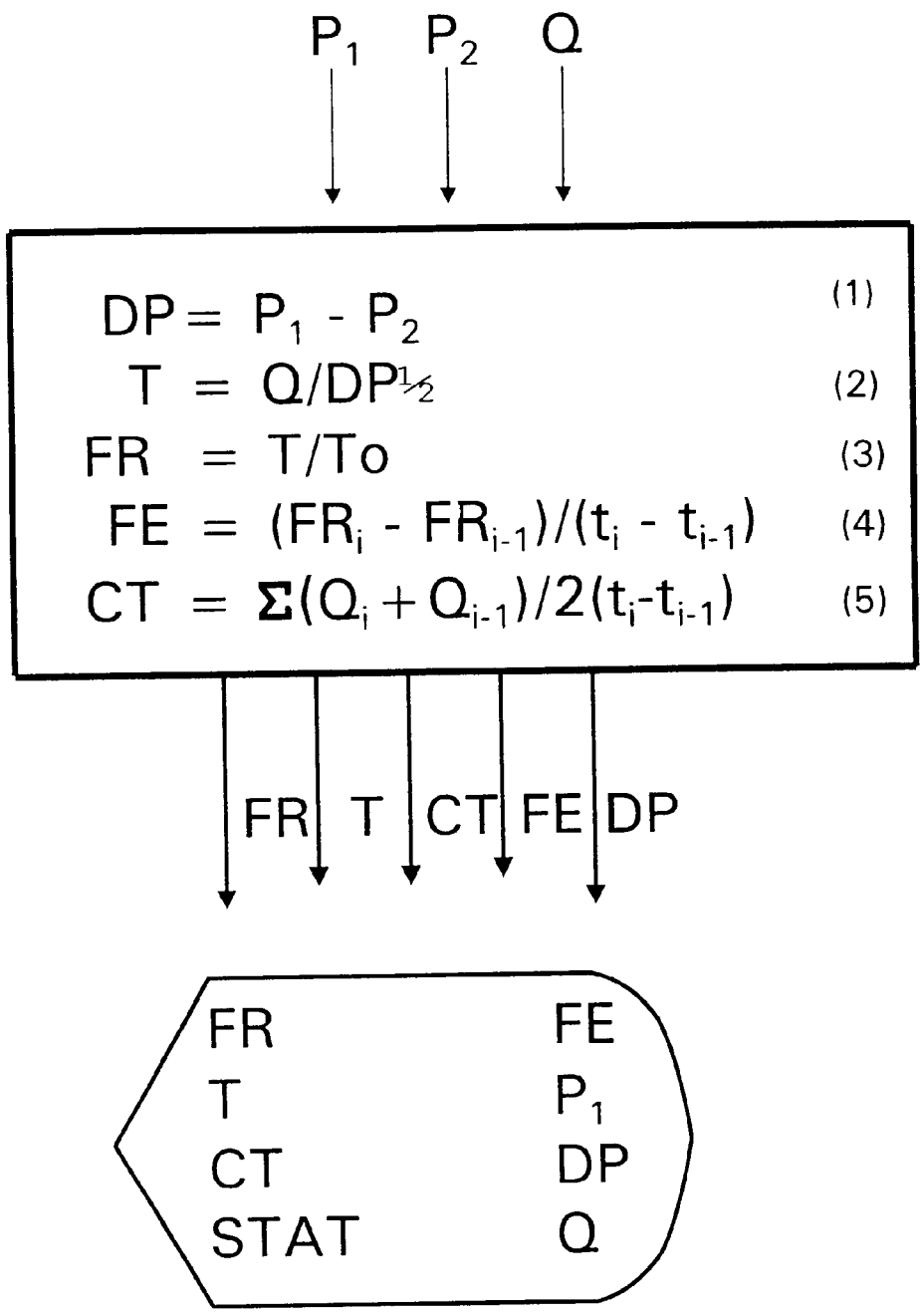
FIG. 3 is a flow chart for processing inputs, displaying outputs, and transmitting control signals for the monitoring of water quality.

An additional capability of the microprocessor controller recorder 10 is also illustrated in FIG. 3, namely the display. The status STAT of the meter is displayed along with variables previously mentioned: FR, T, CT, FE, $P_1$, DP and Q. The STAT is signaled by the keypad and/or logic of the controller.

Figure 4:
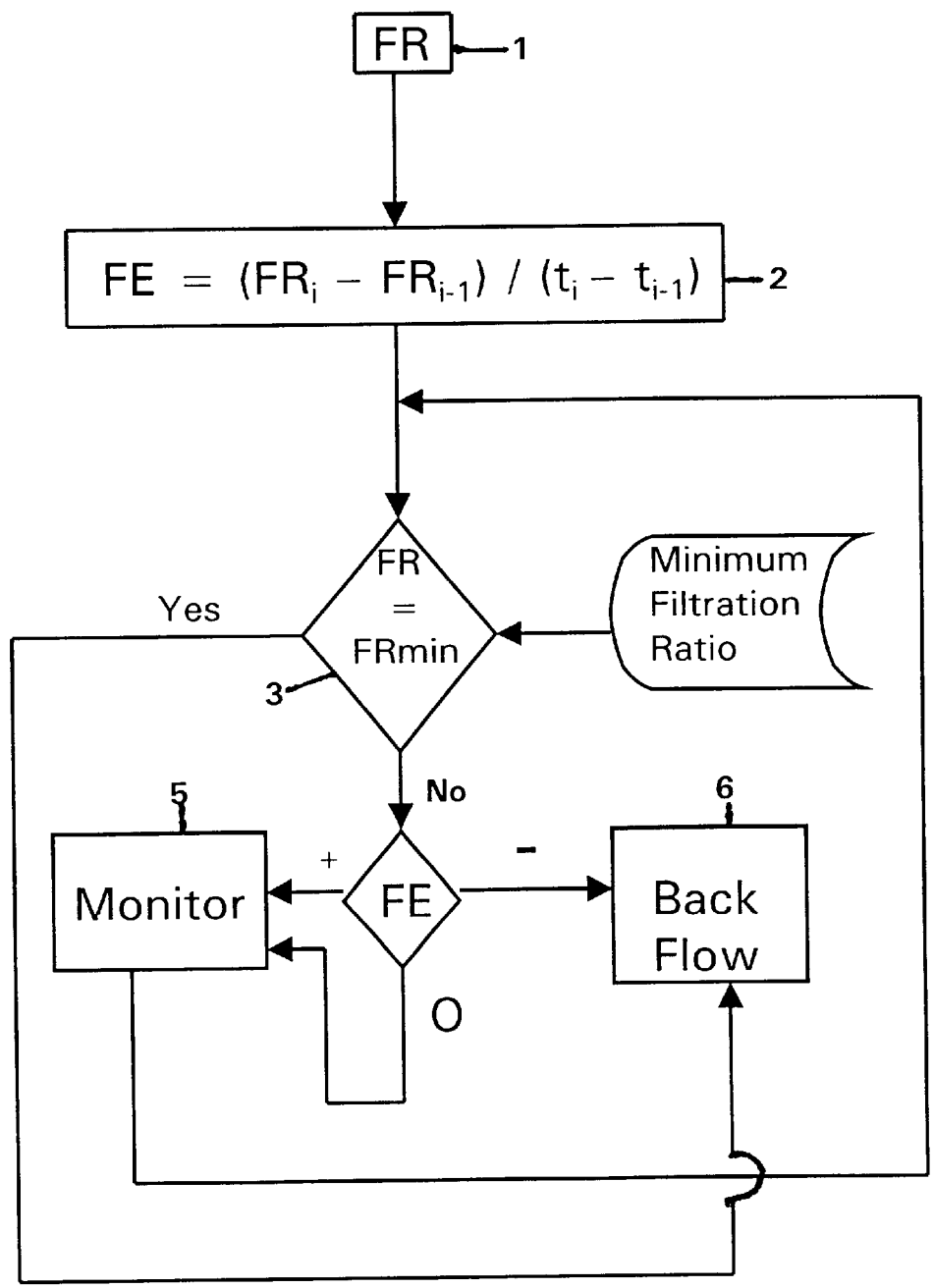
FIG. 4 is a flow chart of the microprocessor control logic for the monitor-cartridge filter stages.

Turning now to FIG. 4 and some of the logic associated with the meter functions: monitor 5 and backflow 6. FE 2 filter effectivenesse is the slope of the FR 1 versus t plot. The quality of the primary filter effluent depends on the sign and magnitude of FE. A zero or positive FE indicates nonplugging of the monitor filter and continuing of the monitor mode M. On the other hand, a negative FE slows plugging of the monitor filter and back flowing 6 of the monitor filter when the minimum filtration ratio set point $FR_{Min}$ is reached. The control logic can be overridden by selection on the keypad of the microprocessor controller recorder.

Typically when the monitor filter element is severely contaminated, the alarm activates. This signals manual override of the monitor function and flushing of the face, matrix, and interstices of the monitor filter cartridge to remove the particle contaminant. A list of contaminants and reagents follows:

| Contaminant | Reagent |
|---|---|
| Calcium carbonate | hydrochloric acid |
| Iron carbonate | citric acid |
| Calcium sulfate | ethylene diamine tetracetric acid |
| Hydrous aluminosilicates | hydrochloric-hydrofluoric acid |
| Silica | hydrofluoric acid |
| Micro-organisms | sodium hypochlorite |
| Oil | ethylene glycol monobutyl ether |

These are familiar to persons versed in the art of contaminant removal and other specific reagents may be needed for particular particles. So too, sequential reagent flushes may be required to remove combinations-contaminants; e.g. oil-coated calcite scale responds to flushes of ethylene glycol monobutyl ether followed by hydrochloric acid. Monitoring by other devices such as oil content meter, pH meter and salinity meter may aid in the selection of reagent(s). The number of reagent reservoirs needed as part of the meter is variable since their need fluctuates and they operate manually.

The DeLonge et al. reference described a chemical fed system for backwash. The present invention has a system of reagent reservoirs with a pressure source, they are configured to flush from the upstream side of the filter. Flushing with various reagents and sequences of reagents determines which process best removed filter cake from the interticies and face of the filter. Often heating helps the reagents to react with the contaminants (filter cake). Applicant's meter's in-line heater 11 lies ahead of the monitor filter holder 12 and the flush loop 54. Heating does not appear in the prior art. It is essential in finding what is soluble about a filter cake so that it can be removed. Damage can be avoided in a water injection well when it is shown which agent will dissolve the containment.

Secondly, heat aids determination of presence of scale forming ions which may not have been removed by selective ion filtration (nano filtration). Nano filtration and, to some extent micro filtration, have application in removing microorganisms which are increasingly contaminating municipal water supplies and water wells during floods.

The Marino patent teaches the use of a pump to force air containing dust through a filter but does not return the air to the sample loop. The patent to Mukogawa et al. uses the head of water in the sampling pipe which is divided into two streams. Flow through dissimilar filters and flow meters measures the respective flow rates. The ratios of the time dependent change in the outputs of each flow meter are indirectly related to the concentration of solids. Childs et al. teach utilizing a pump in their filter monitor. It flushes through filters in parallel rather than in series as disclosed in the present invention. (Series filters of different filtration designation enable longer runs before change out is necessary.) Series filters in the backflow loop increases the backflow cycle.

The pump (not shown) permits forcing the fluid through the monitor filter, downstream and back into the main effluent line downstream of the primary filter. This is more environmentally correct and diminishes the cost of fluid disposal once it leaves the meter. Should a constant rate pump be used, two upstream pressure transducers alone are needed to indicate solids presence in the liquid. The microprocessor equation would cancel flow rate in the numerator and denominator of the Filtration Ratio FR.

Figure 5:
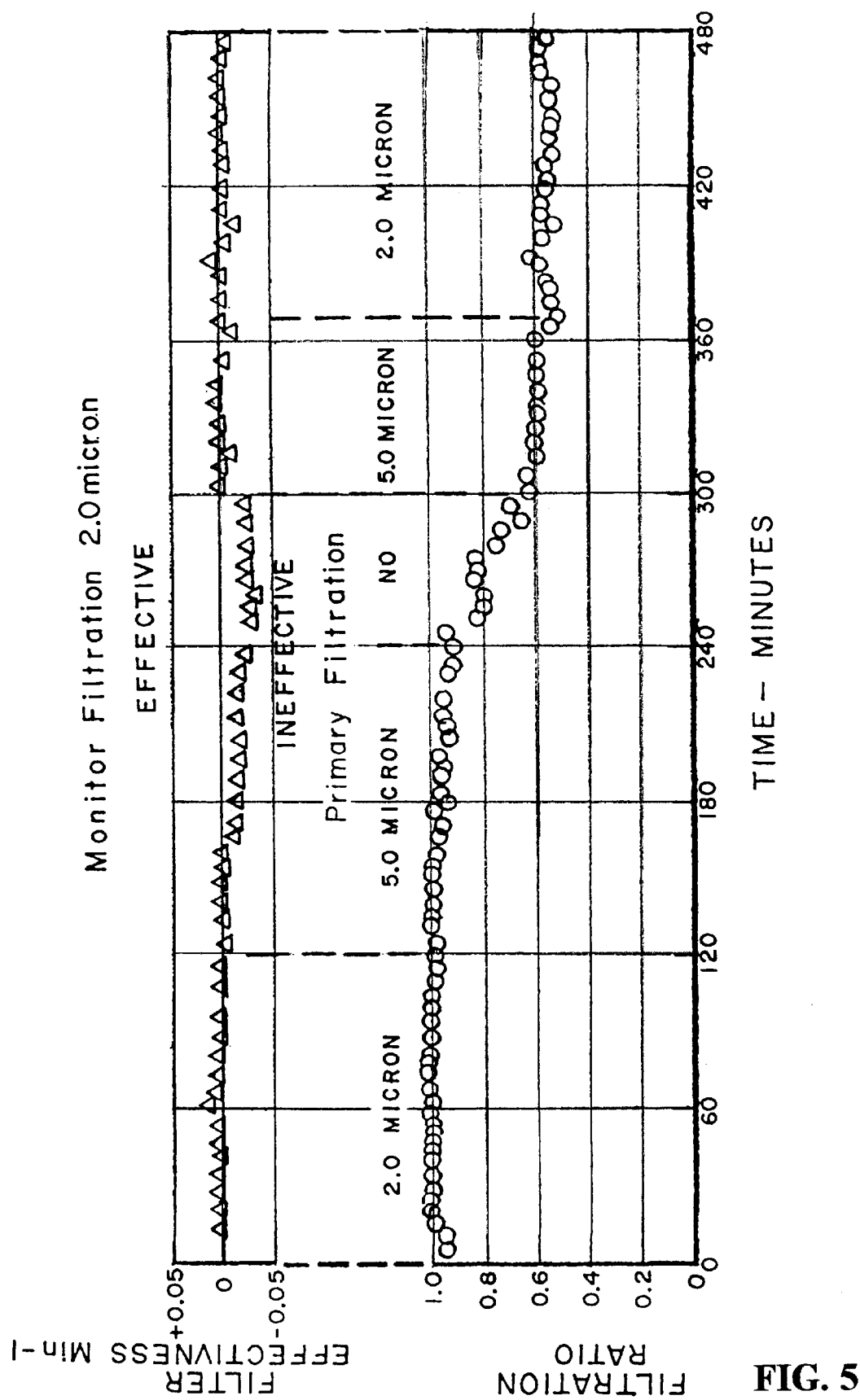
FIG. 5 is a typical plot of meter response to changes in primary filter effectiveness versus time.

Consider, for example, dynamic monitoring with the filter meter the results of which are presented in FIG. 5. The experiment demonstrates the advantage of an apparatus that responds to the primary mechanism of filtration: particle concentration, composition, size distribution and loading. As primary filtration becomes coarser, the quality of the effluent declines. Filtration ratio FR as measured and calculated with a two-micron monitor filter in the meter reflects the changes: 1) primary filtration of two microns is excellent. FR=1.0; 2) five micron primary filtration results in good quality FR=0.9; and 3) no primary filtration yields the poorest water quality FR=0.6.

The upper plot in FIG. 5 is of filter effectiveness FE. FE delineates the effectiveness of the primary filter at removing the solids in the water with changing degrees of primary filtration. A positive value of FE indicates improving water quality. A zero value of FE indicates a nonplugging primary filter effluent. While a negative value of FE shows primary filtered water plugging potential. All of the phases of FE are illustrated in FIG. 5. Where the upper plot shows two regions of primary filtration; effective and ineffective. The primary filter is effective if FE is equal or greater than zero while it is ineffective if FE is less than zero. Thus the two zones of the impact of primary filtration are effective and ineffective.

Figure 6:
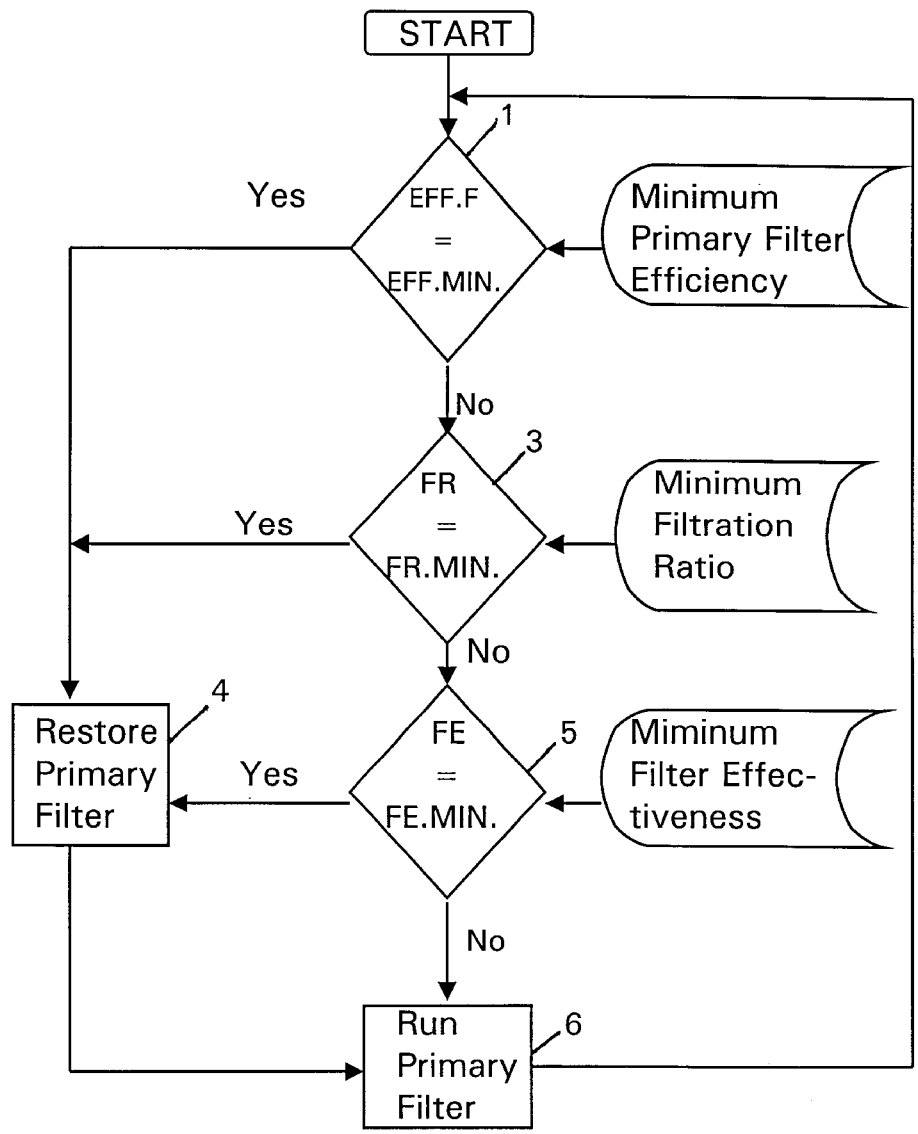
FIG. 6 is a flow chart of the microprocessor control logic for the primary filter stages.

Referring now to FIG. 6, there is an illustration of the logic for control of the quality of the primary filter effluent. The primary filter is not shown in FIG. 1, rather the signal 28 generated by the microprocessor controls the restoration stage of the primary filter. Primary filter restoration can be backwashing a sand filter or replacing fouled cartridges of a cartridge filter. The two basic stages of the primary filter are Restore 4 and Run 6. After starting the primary filter, the macro variables of the primary filter are read and the Efficiency I of the primary filter is determined, much in the same manner as the FR 1 (FIG. 3) of the monitor filter:

Eff. $= T/T_0 \times 100$ of the primary filter. This is compared with the Minimum Efficiency setpoint. Next, the microprocessor evaluates the monitor filter meter micro variables: Filtration ratio FR 3 and filter effectiveness FE 5. Should FR and FE equal minimum values of filtration ratio and filter effectiveness, respectively, the primary filter restores 4 after which the primary filter runs 6. Thus by signaling the restoration of the primary filter as needed, either by analysis of filter meter micro variables or primary filter macro variables, the ability of the primary filter to maintain a desired degree of filtration is enhanced.

The present invention may be subject to many modifications and changes without departing from the spirit or essential characteristics thereof. The present embodiment should therefore be considered in all respects as illustrative and not restrictive of the scope of the invention as defined by the appended claims.

I claim:

1. A meter for monitoring the presence of solids of an undesirable size in a liquid which is sampled continuously, said meter comprising:

a sample loop;

a cartridge filter element mounted in said sample loop;

a first pressure transducer mounted in said sample loop upstream of the filter element;

a second pressure mounted in said sample loop downstream of the filter element;

a flow meter mounted in said sample loop downstream of the filter element;

a backflow loop connected to said sample loop for back flowing liquid through said filter element;

a flush loop having a plurality of reagent reservoirs for flushing the face and interstices of the filter element to remove the particles collected there; and microprocessor means capable of recording, computing and displaying an indication of the solids content of said liquid.

2. The meter according to claim 1 further comprising:

a pair of filter cartridges located in said backflow loop.

3. A method of evaluating the solids content in a liquid stream which contains contaminants of unknown content, size and composition, comprising the steps of:

dynamically sampling the effluent of said liquid stream to ensure a representative sample;

providing a cartridge filter of known filtration to entrap suspended particles;

measuring the differential pressure at equal elevation on either side of said cartridge filter;

sensing flow rate;

calculating the presence of contaminants in the liquid by microprocessor and determining the effectiveness of the filtration by trends of the filtration ratio; and signaling to continue the cycle should water quality be at a limit set by the operator.

4. The method according to claim 3 further comprising the step of:

back flowing to remove contaminants from the cartridge filter.

5. The method according to claim 3 further comprising the step of:

flushing the contaminants from the cartridge filter with reagents to determine if the contaminants are soluble.

6. The method according to claim 5 wherein said reagents are selected from the group including hydrochloric acid, citric acid, ethylene diamine tetracetric acid, hydrochloric-hydrofluoric acid, hydrofluoric acid, sodium hypochlorite, and ethylene glycol monobutyl ether.

7. The method according to claim 5 wherein said reagents are capable of dissolving and removing contaminants from said filter.

* * * * *